(12) United States Patent
Davis

(10) Patent No.: US 6,650,796 B2
(45) Date of Patent: Nov. 18, 2003

(54) WAVEGUIDE OPTICAL FREQUENCY ROUTER

(75) Inventor: Richard L. Davis, Redondo Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/081,324

(22) Filed: Feb. 21, 2002

(65) Prior Publication Data

US 2003/0156775 A1 Aug. 21, 2003

(51) Int. Cl.[7] .............................................. G02F 1/295
(52) U.S. Cl. ............................. 385/10; 385/22; 385/37; 389/121; 389/148
(58) Field of Search ............................. 385/10, 37, 22, 385/24, 31, 38, 39; 389/121, 148, 145, 171

(56) References Cited

U.S. PATENT DOCUMENTS

| | | |
|---|---|---|
| 4,740,951 A | 4/1988 | Lizet et al. |
| 4,923,271 A | 5/1990 | Henry et al. |
| 5,002,350 A | 3/1991 | Dragone |
| 5,093,876 A | 3/1992 | Henry et al. |
| 5,450,511 A * | 9/1995 | Dragone .................. 385/37 |
| 5,721,796 A | 2/1998 | De Barros et al. |
| 5,835,517 A | 11/1998 | Jayaraman et al. |

OTHER PUBLICATIONS

H.M. Stoll, "Distributed Bragg Deflector: A Multifunctional Integrated Optical Device," App. Opt., Aug. 1978, pp. 2562–2569, vol. 17.
H. Takahashi et al., "10 GHz Spacing Optical Frequency Division Multiplexer Based On Arrayed–Waveguide Grating," Electronic Letters, Feb. 13, 1992, vol. 28, No. 4.
A.R. Vellekoop et al., "Four Channel Integrated–Optic Wavelength Demultiplexer With Weak Polarization Dependence", Journal of Lightwave Technology, Mar. 1991, pp. 310–314, vol. 4, No. 3.

* cited by examiner

*Primary Examiner*—Phan T. H. Palmer
(74) *Attorney, Agent, or Firm*—Harness, Dickey & Pierce, P.L.C.

(57) ABSTRACT

A compact and easily manufacturable waveguide optical frequency router (10) is provided. The router (10) has a transmit core region (12) and a plurality of receive core regions (14) formed within a slab region (18). The router (10) further includes an array of distributed Bragg deflectors (DBDs) (16) formed within the core regions (12,14) for coupling optical energy (20) between the transmit core region (12) and the receive core regions (14) via the slab region (18). The array of DBDs (16) distributes the optical energy (20) between the receive core regions (14) based on optical wavelength and propagation angle.

21 Claims, 5 Drawing Sheets

WAVEGUIDE OPTICAL FREQUENCY ROUTER

STATEMENT OF GOVERNMENT OWNERSHIP

This invention was made with Government support under Contract No. F30602-96-C-0273 awarded by the U.S. Air Force. The Government has certain rights in this invention.

FIELD OF THE INVENTION

The invention relates generally to optical frequency routers. More particularly, the invention relates to a waveguide optical frequency router having an array of distributed Bragg deflectors.

BACKGROUND OF THE INVENTION

Many emerging applications such as electronic warfare and telecommunications rely on the ability to route optical signals to particular destinations depending upon the frequency of the optical beam. For example, dense wavelength division multiplexing (DWDM) requirements are such that optical carriers differing in frequency by 50 GHz must be separated. Even more stringent requirements exist for photonic radio frequency (RF) spectrum analyzers, where it is desirable to sort an optical carrier that is modulated with an RF signal into 1 GHz wide or smaller frequency channels.

One approach to wavelength division multiplexing involves the use of bulk diffraction gratings. Under this approach, an input signal containing several optical wavelengths will be directed to a collimating lens, which projects the input signal on one or more diffraction gratings. A diffraction grating comprises a plurality of parallel lines or grooves spaced extremely closely together. Light incident on the lines produces a rainbow spectrum with each wavelength spread through a different angle as a result of diffraction. Additional lenses can be used to focus the diffracted light onto photo detectors or optical fibers (depending upon the application). One particular shortcoming of the bulk diffraction grating approach is that it results in relatively large devices that are sensitive to environmental influences. In fact, in order to achieve the 1 GHz resolution requirement of certain applications, a device approximately 2'X3'X2' would be required.

Another approach to wavelength division multiplexing involves the use of the arrayed waveguide grating (AWG). The AWG approach typically involves fabricating several hundred channel waveguides onto a substrate. By precisely controlling the length of each channel waveguide, the AWG is able to distribute the optical energy according to the wavelength between various output channel waveguides formed on the substrate. It is important to note that in order to achieve an optical frequency resolution of 1 GHZ, the length of the channel waveguides must be controlled to within a fraction of an optical wavelength. The AWG is therefore complex and quite difficult to manufacture.

Furthermore, the channel response characteristics for both of the above approaches are difficult (and in some cases impossible) to tailor without incurring excess complexity and additional optical loss. It is therefore desirable to provide a waveguide optical frequency router that is compact, monolithic, and can achieve optical frequency resolutions in the range of 1 GHz. It is also desirable to provide a waveguide optical frequency router whose frequency response can be readily tailored to suit the needs of a variety of applications, and can easily be manufactured.

BRIEF SUMMARY OF THE INVENTION

The above and other objectives are provided by a waveguide optical frequency router in accordance with the present invention. The router has a transmit 2-dimensional optical waveguide core region formed within a planar optical waveguide slab region. A plurality of receive core regions are also formed within the slab region. The router further includes an array of Bragg gratings formed within the core regions for coupling optical energy between the transmit core region and the receive core regions via the slab region. Together the slab region, core region, and Bragg grating constitute a distributed Bragg deflector (DBD). The array of DBDs distributes the optical energy between the receive core regions based on wavelength and propagation angle. The array of DBDs therefore provide compactness, and high optical frequency resolution.

Further in accordance with the present invention, an array of DBDs is provided. The array includes a transmit DBD formed within a transmit core region. The transmit DBD diffracts optical energy having a first wavelength into a slab region at a first angle, and diffracts optical energy having a second wavelength into the slab region at a second angle and similarly for a plurality of optical wavelengths. A first receive DBD diffracts only optical energy of the first wavelength propagating at the first angle into the first receive core region. The first receive DBD also passes all other optical energy through the first receive core region and into the slab region. In a preferred embodiment, a second receive DBD is formed where the second receive DBD diffracts optical energy of the second wavelength propagating at the second angle into the second receive core region, and similarly for a plurality of receive DBDs.

In another aspect of the invention, a method for fabricating an array of DBDs is provided. The method includes the step of forming a transmit DBD comprising a transmit core region and a Bragg grating formed in a slab region. The transmit DBD diffracts optical energy having a first wavelength into a slab region at a first angle and diffracts optical energy having a second wavelength into the slab region at a second angle and similarly for a plurality of wavelengths. A first receive DBD is formed where the first receive DBD diffracts only optical energy of the first wavelength propagating at the first angle into the first receive core region. The method further provides for forming a second receive DBD, where the second receive DBD diffracts only optical energy of the second wavelength propagating at the second angle into the second receive core region and similarly for a plurality of receive DBDs. In a highly preferred embodiment, the diffraction gratings for the receive DBDs are formed by holographically projecting a predetermined fringe pattern onto the receive core regions, and generating gratings having periods and angles in accordance with the predetermined fringe pattern.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings, in which:

DETAILED DESCRIPTION OF THE INVENTION

Figure 1:
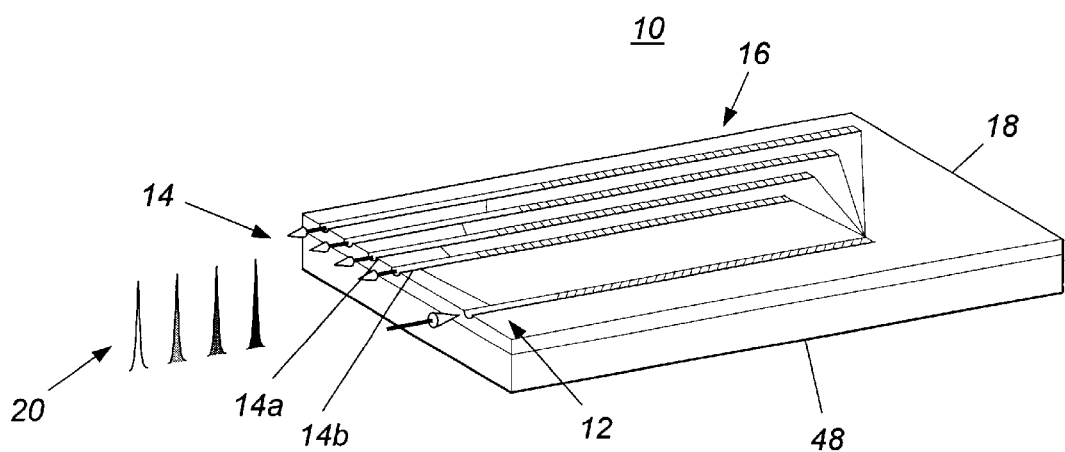
FIG. 1 is a perspective view showing a waveguide optical frequency router in accordance with the principles of the present invention.

Turning now to FIG. 1, one approach to the present invention is shown in greater detail. Generally, a waveguide optical frequency router 10 has a transmit 2-dimensional optical waveguide core region 12 formed within a planar optical waveguide slab region 18. A plurality of receive core regions 14 are also formed within the slab region 18. The router 10 further includes an array of Bragg gratings formed within the core regions 12, 14 for coupling optical energy between the transmit core region 12 and the receive core regions 14 via the slab region 18. Together the slab region 18, core regions 12, 14, and Bragg gratings constitute an array of distributed Bragg deflectors (DBDs) 16. It can be seen that the optical energy 20 is distributed among a plurality of wavelengths (four wavelengths are illustrated). As will be described in greater detail below, the array of DBDs 16 distributes the optical energy between the receive core regions 14 based on the propagation angle of each wavelength in the slab region.

It will be appreciated that the geometric layout of the router 10 is quite different from that of conventional approaches. For example, a first receive core region 14a is disposed adjacent to the transmit core region 12, whereas the arrayed waveguide grating (AWG) separates the input and output core regions by a plurality of concave slabs and a complex array of waveguides. Furthermore, a second receive core region 14b is disposed between the first receive core region 14a and the transmit core region 12, wherein the receive core regions 14 are parallel to the transmit core region 12. This geometric layout allows a much smaller router 10 than available under either the bulk diffraction grating or AWG approach described above. The coupling of the optical energy 20 between the receive core regions 14 and the transmit core region 12 will be described in greater detail below.

It is important to note that the illustrated router 10 is highly simplified for the purposes of discussion. For example, while the optical energy 20 is shown to have four distinct wavelengths, it is quite conceivable that the particular application will require the routing of hundreds of frequencies. Since the number of receive core regions 14 typically corresponds to the number of wavelengths, hundreds of receive core regions 14 could also be required. It is also important to note, however, that the number of receive core regions 14 does not necessarily have to correspond to the number of wavelengths. This would be the case of only a few wavelengths in the optical energy 20 being of interest.

Furthermore, while the present invention will be primarily described with respect to the demultiplexing of the optical energy 20, it will be appreciated that the router 10 is bidirectional. Thus, energy can be launched into the receive core regions 14 and extracted from the transmit core region 12 if a multiplexing function is desired.

Notwithstanding, it is preferred that the waveguides and DBDs are fabricated on a top surface of a silicon substrate 48 that has been thermally oxidized. The silicon oxide serves as a high-quality substrate layer upon which the slab region 18 and core regions 12,14 are constructed. Typically, a glass overlay (not shown) is applied to the entire router 10 to enhance the optical throughput and mechanical robustness of the router 10. The optical waveguides can be fabricated from glass layers that are formed by low-pressure, chemical vapor deposition, or sputter deposition. The optical waveguides may also be deposited as sol-gel glasses, or by some combination of the above. In this manner, an optical frequency channelizer having 100 channels separated by 1–2 GHz can be fabricated on a substrate 48 that is about 100 mm long and only 6 mm wide. A 64 channel, dense wavelength division multiplexer operating on the next-generation 50 GHz ITU frequency grid would be about 6 mm long by 4 mm wide. These devices can also be fabricated using semiconductor materials, which would reduce the device size by a factor of 2 or greater.

Figure 2B:
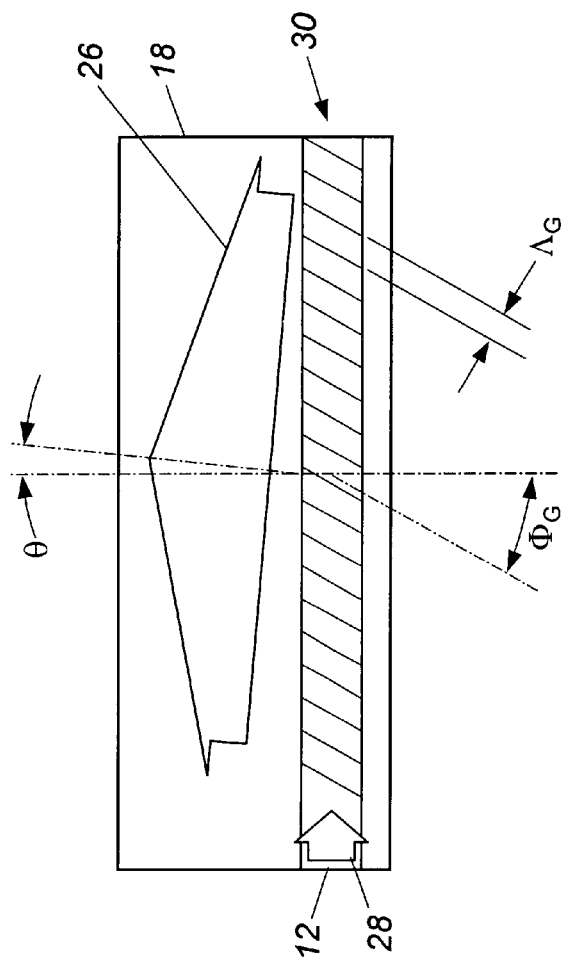
FIG. 2B is a top view of the distributed Bragg deflector comprising the core region and the slab region shown in FIG. 2A wherein the core region has a Bragg diffraction grating.
Figure 2A:
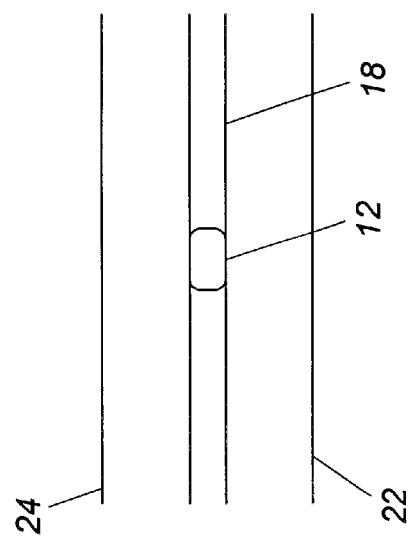
FIG. 2A is an end view of a core region and a slab region in accordance with the principles of the present invention.

FIGS. 2A and 2B provide a more detailed explanation of the theory underlying the present invention. For example, it can be seen that the router generally includes a first cladding region 22 underlaying the bottom surface of the slab region 18, and a second cladding region 24 overlaying the top surface of the slab region 18. The cladding regions 22, 24 have predetermined indices of refraction $n_0$ such that the optical energy can be contained within the slab region 18 and the core region 12. Thus, the slab region 18 has an index of refraction $n_1$ that is greater than $n_0$, and the core region 12 has an index of refraction $n_2$ that is greater than both $n_0$ and $n_1$.

It can further be seen that a DBD is generally an integrated optic Bragg scattering device that utilizes single-mode 2-dimensional optical waveguides, which are commonly referred to as slab-coupled waveguides. This type of structure supports a one-dimensional guided mode 26 (i.e., bounded in one direction) in the slab region 18, and a two-dimensional guided mode 28 (i.e., bounded in two directions) in the core region 12. By locating an appropriate periodic waveguide perturbation (i.e., grating) 30 in the core region 12, a 2-D mode propagating in the core region 12 can be coupled to a 1-D mode in the slab region 18.

Figure 3:
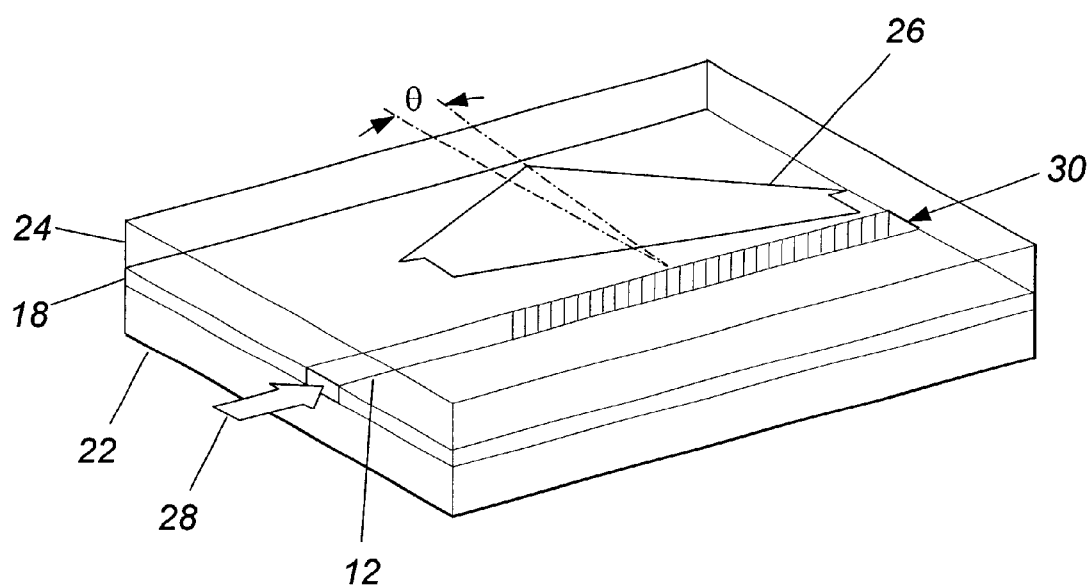
FIG. 3 is a perspective view of the distributed Bragg deflector shown in FIG. 2B.

When a DBD is operated as shown in FIGS. 2B and 3 we call this a transmit DBD. In this case, the direction of propagation for the slab mode is highly wavelength dependent and can be determined by the grating phase-match condition, $$\sin\theta^T = \frac{n_{g2}}{n_{g1}}\left(1 - \frac{\lambda}{n_{g2}}\frac{\cos\Phi_G^T}{\Lambda_G^T}\right),$$

where $\lambda$ is the optical wavelength, $\Lambda_G^T$ is the grating period and $\Phi_G^T$ is the grating 30 angle. $N_{g1}$ and $N_{g2}$ are the effective indices for the guided optical modes propagating in the slab and core regions respectively. The superscript T refers to a transmit DBD. In the proposed concept, the grating 30 is configured such that for a nominal center wavelength, $\lambda_O^T$, the angle of the slab mode is zero degrees (i.e., perpendicular to the core region). In this case we have $$\frac{\Lambda_G^T}{\cos\Phi_G^T} = \frac{\lambda_0^T}{n_{g2}},$$

and the propagation angle is given by $$\theta^T = \frac{n_{g2}}{n_{g1}}\left(\frac{\lambda_0^T - \lambda}{\lambda_0^T}\right)$$

Figure 4:
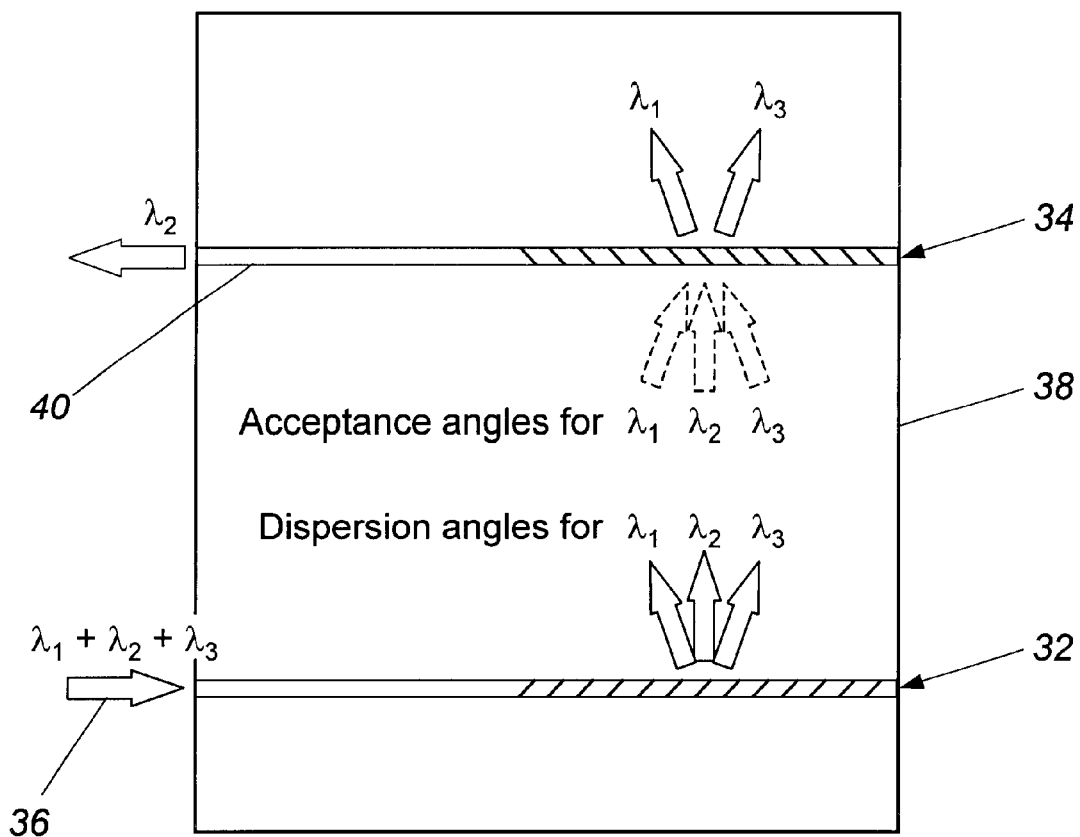
FIG. 4 is a diagram showing the coupling of optical energy having a distinct wavelength between a transmit core region and a receive core region.

The operation of a highly-selective, optical wavelength filter consisting of back-to-back DBDs 32, 34 is illustrated in FIG. 4. The incident, multi-wavelength light 36 is dispersed over a range of angles in the slab region 38 by the transmit DBD 32. A second DBD, which we call the receive DBD 34, is configured so that it will accept a particular wavelength, and couple that wavelength from a slab mode to a core mode, only if it is propagating at (or very near) the angle given by $$\theta^R = \frac{n_{g2}}{n_{g1}}\left(\frac{\lambda - \lambda_0^R}{\lambda_0^R}\right),$$

where the superscript R refers to the receive DBD. Incident light propagating in the core region of the transmit DBD will couple to a slab mode and then into a core mode of the receive DBD only if the transmit angle, $\theta^T$, is the same as the receive angle, $\theta^R$. Equating these angles leads to the following expression for the wavelength extracted from the incident beam, $$\lambda = \frac{2\lambda_0^T \lambda_0^R}{(\lambda_0^T + \lambda_0^R)}.$$

The above situation is depicted in FIG. 4, where the incident light 36 includes three different wavelengths. It can be seen that the grating phase-match condition is satisfied for a particular wavelength and propagation angle, $\lambda = \lambda_2$, and thus, that wavelength is coupled into the core region 40 of the receive DBD 34. As the incident wavelengths depart from $\lambda_2$ they are deflected by the transmit DBD 32 at angles that do not comply with the phase-match condition of the receive DBD 34, and those wavelengths are not coupled to the core region 40. Therefore, they continue as slab guided modes.

By fabricating many receive DBDs, one next to the other, and progressively changing the gratings' periods and angles, a manifold of filters spanning an entire wavelength range of interest can be constructed. For filters constructed in this manner, the width of the optical passband is determined by the length of the gratings in the DBDs. In terms of optical wavelength we have $$\Delta\lambda = \frac{\rho\lambda^2}{2n_{g2}L},$$

where L is the length of the DBDs' grating and $\rho$ is a resolution factor that depends on such parameters as the shape of the filter response and the desired degree of crosstalk suppression between neighboring channels. Typically $2<\rho<4$. We can also express the filter bandwidth in terms of the optical frequency, v. In this case, the above equation becomes $$\Delta v = \frac{\rho c}{2n_{g2}L},$$

The filter response shape is primarily a function of the spatial distribution of optical energy in the slab guided optical wave in the plane of the slab. In the proposed concept, this distribution readily can be controlled by varying the amplitude and phase of the grating's coupling coefficient along the length of the DBD. By appropriately tailoring the coupling coefficient any desired filter response can be attained.

Figure 5:
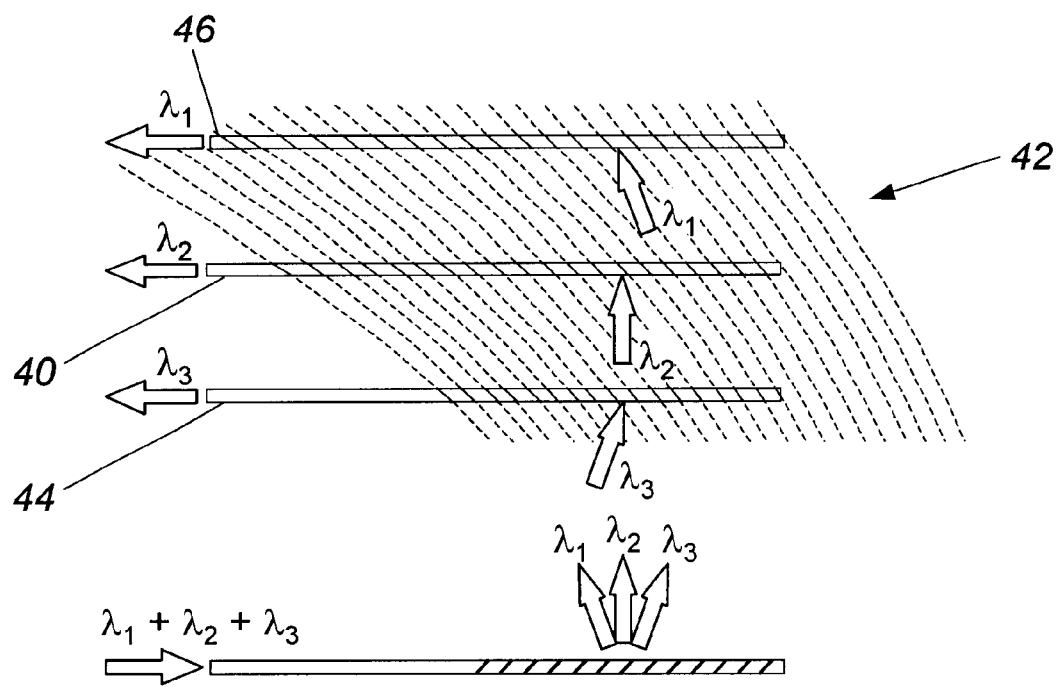
FIG. 5 is a diagram showing a holographically projected fringe pattern in accordance with the principles of the present invention.

FIG. 5 illustrates a technique for constructing an array of filters with the requisite variation of grating period and angle by using well known holographic techniques. The dashed lines represent an optical fringe pattern 42 projected onto the surface of the optical router. Combinations of cylindrical optics can be used to generate non-uniform wavefronts that interfere to create the desired fringe pattern. Depending on the details of the fabrication process, the fringe pattern 42 may be replicated either in photoresist deposited on the surface of the core regions 40, 44, 46 and subsequently etched to form a relief grating, or transferred directly to core regions that are photoresponsive. That is, the core regions 40, 44, 46 are fabricated out of a material having a refractive index that is modifiable by exposure to light. Such photoresponsive waveguide cores might include an appropriately doped silica-glass or a sol-gel glass.

The waveguide optical frequency router is therefore compact, monolithic, and can achieve optical frequency resolutions in the range of 1 GHz. Specifically, distributing optical energy based on propagation angle, as opposed to waveguide length (as in the AWG approach) provides a means for the router to have a frequency response that is readily tailored to suit the needs of a variety of applications and enables the router to be easily manufactured. Such a device has utility in numerous applications including, but not limited to, optical wavelength division multiplexers and demultiplexers, optical radio frequency signal channelizers, splitterless optical broadcast switches, multi-amplifier mode-locked lasers, or highly accurate discretely-tunable lasers.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed:

1. A waveguide optical frequency router comprising:
    a transmit core region formed within a slab region;
    a plurality of receive core regions formed within the slab region; and
    an array of Bragg gratings formed within the core regions for coupling optical energy between the transmit core region and the receive core regions via the slab region, the array of gratings distributing the optical energy between the receive core regions based on optical wavelength and propagation angle.

2. The router of claim 1 wherein the receive core regions include:
    a first receive core region disposed adjacent to the transmit core region;
    a second receive core region disposed between the first receive core region and the transmit core region; and said receive core regions being parallel to the transmit core region.

3. The router of claim 2, wherein each DBD has a predetermined optical passband based on a length of the DBD.

4. A waveguide optical frequency router comprising:
a transmit core region formed within a slab region;
a transmit distributed Bragg deflector (DBD) formed within the transmit core region, the transmit DBD diffracting optical energy having a first wavelength into the slab region at a first angle and diffracting optical energy having a second wavelength into the slab region at a second angle;
a plurality of receive core regions formed within the slab region;
an array of Bragg gratings formed within the core regions for coupling optical energy between the transmit core region and the receive core regions via the slab region, the array of gratings distributing the optical energy between the receive core regions based on optical wavelength and propagation angle;
a first receive DBD, the first receive DBD diffracting the optical energy at the first wavelength propagating at the first angle into the first receive core region; and
a second receive DBD, the second receive DBD diffracting the optical energy at the second wavelength propagating at the second angle into the second receive core region.

5. The router of claim 4 wherein the core regions include a material having a refractive index that is modifiable by exposure to light.

6. The router of claim 5 wherein the core regions include doped silica-glass.

7. The router of claim 5 wherein the core regions include doped sol-gel glass.

8. The router of claim 4 wherein the receive DBDs have grating periods and angles that define a predetermined fringe pattern.

9. A waveguide optical frequency router comprising:
a transmit core region formed within a slab region;
a plurality of receive core regions formed within the slab region;
an array of Bragg gratings formed within the core regions for coupling optical energy between the transmit core region and the receive core regions via the slab region, the array of gratings distributing the optical energy between the receive core regions based on propagation angle;
a first cladding region underlaying a bottom surface of the slab region;
a second cladding region overlaying a top surface of the slab region; and
said cladding regions having predetermined indices of refraction such that the optical energy may be contained within the slab region and the core regions.

10. The router of claim 9 further including a substrate underlaying a bottom surface of the first cladding region.

11. An array of distributed Bragg deflectors (DBDs) for a waveguide optical frequency router, the array comprising:
a transmit DBD formed within a transmit core region, the transmit DBD diffracting optical energy having a first wavelength into a slab region at a first angle and diffracting optical energy having a second wavelength into the slab region at a second angle;
a first receive DBD formed within a first receive core region; and said first receive DBD diffracting the optical energy of the first wavelength propagating at the first angle into the first receive core region and passing the optical energy of the second wavelength propagating at the second angle through the first receive core region.

12. An array of distributed Bragg deflectors (DBDs) for a waveguide optical frequency router, the array comprising:
a transmit DBD formed within a transmit core region, the transmit DBD diffracting optical energy having a first wavelength into a slab region at a first angle and diffracting optical energy having a second wavelength into the slab region at a second angle;
a first receive DBD formed within a first receive core region, said first receive DBD diffracting the optical energy of the first wavelength propagating at the first angle into the first receive core region and passing the optical energy of the second wavelength propagating at the second angle through the first receive core region; and
a second receive DBD formed within a second receive core region, said second receive DBD diffracting the optical energy of the second wavelength propagating at the second angle into the second receive core region.

13. The array of claim 12 wherein the receive DBDs have grating periods and angles that define a predetermined fringe pattern.

14. An array of distributed Bragg deflectors (DBDs) for a waveguide optical frequency router, the array comprising:
a transmit DBD formed within a transmit core region, the transmit DBD diffracting optical energy having a first wavelength into a slab region at a first angle and diffracting optical energy having a second wavelength into the slab region at a second angle;
a first receive DBD formed within a first receive core region, said first receive DBD diffracting the optical energy of the first wavelength propagating at the first angle into the first receive core region and passing the optical energy of the second wavelength propagating at the second angle through the first receive core region;
a second receive DBD formed within a second receive core region, said second receive DBD diffracting the optical energy of the second wavelength propagating at the second angle into the second receive core region; and
said core regions including a material having a refractive index that is modifiable by exposure to light.

15. The array of claim 14 wherein the core regions include doped silica-glass.

16. The array of claim 14 wherein the core regions include doped sol-gel glass.

17. A method for fabricating an array of distributed Bragg deflectors (DBDs), the method comprising the steps of:
forming a transmit DBD within a transmit core region, the transmit DBD diffracting optical energy having a first wavelength into a slab region at a first angle and diffracting optical energy having a second wavelength into the slab region at a second angle;
forming a first receive DBD within a first receive core region, the first receive DBD diffracting optical energy of the first wavelength propagating at the first angle into the first receive core region; and
forming a second receive DBD within a second receive core region, the second receive DBD diffracting optical energy of the second wavelength propagating at the second angle into the second receive core region.

18. The method of claim 17 further including the step of using photoresist to generate the gratings.

19. A method for fabricating an array of distributed Bragg deflectors (DBDs), the method comprising the steps of:
forming a transmit DBD within a transmit core region, the transmit DBD diffracting optical energy having a first wavelength into a slab region at a first angle and diffracting optical energy having a second wavelength into the slab region at a second angle;
forming a first receive DBD within a first receive core region, the first receive DBD diffracting optical energy of a first wavelength propagating at the first angle into the first receive core region;
forming a second receive DBD within a second receive core region, the second receive DBD diffracting optical energy of a second wavelength propagating at the second angle into the second receive core region;
holographically projecting a predetermined fringe pattern onto the receive core regions; and
generating gratings having periods and angles in accordance with the predetermined fringe pattern.

20. A method for fabricating an array of distributed Bragg deflectors (DBDs), the method comprising the steps of:
forming a transmit DBD within a transmit core region, the transmit DBD diffracting optical energy having a first wavelength into a slab region at a first angle and diffracting optical energy having a second wavelength into the slab region at a second angle;
forming a first receive DBD within a first receive core region, the first receive DBD diffracting optical energy of the first wavelength propagating at the first angle into the first receive core region;
forming a second receive DBD within a second receive core region, the second receive DBD diffracting optical energy of the second wavelength propagating at the second angle into the second receive core region;
fabricating the receive core regions out of a material having a refractive index that is modifiable by exposure to light; and
modifying the refractive index of the material in accordance with the predetermined fringe pattern.

21. A waveguide optical frequency router comprising:
a substrate;
a first cladding region situated on the top surface of the substrate;
a slab region situated on the top surface of the first cladding region; a second cladding region situated on the top surface of the slab region;
a transmit core region formed within the slab region;
a first receive core region disposed adjacent to the transmit core region;
a second receive core region disposed between the first receive core region and the transmit core region;
said receive core regions being parallel to the transmit core region; and
an array of distributed Bragg deflectors (DBDs) formed within the core regions for coupling optical energy between the transmit core region and the receive core regions via the slab region, the array of DBDs distributing the optical energy between the receive core regions based on optical wavelength and propagation angle; and
said cladding regions having predetermined indices of refraction such that the optical energy is contained within the slab region and the core regions.

* * * * *